United States Patent [19]
Danz et al.

[11] Patent Number: 5,557,521
[45] Date of Patent: Sep. 17, 1996

[54] CONTROL SYSTEM FOR CHANGING AUTOMATIC GEARS

[75] Inventors: Wolfgang Danz, Friedrichshafen; Wolfgang Runge, Ravensburg; Gerhard Eschrich, Tettnang; Udo Gillich, Meckenbeuren, all of Germany

[73] Assignee: ZF Friedrichshafen AG, Friedrichshafen, Germany

[21] Appl. No.: 325,329

[22] PCT Filed: May 7, 1993

[86] PCT No.: PCT/EP93/01127

§ 371 Date: Oct. 24, 1994

§ 102(e) Date: Oct. 24, 1994

[87] PCT Pub. No.: WO93/23689

PCT Pub. Date: Nov. 25, 1993

[30] Foreign Application Priority Data

May 11, 1992 [DE] Germany .................. 42 15 406.5

[51] Int. Cl.⁶ .................................... B60K 41/06
[52] U.S. Cl. ................... 364/424.1; 364/431.07; 395/905; 477/43
[58] Field of Search ................... 364/424.1, 436, 364/424.05, 426.01, 554; 395/900, 905; 123/399, 395; 477/143, 155, 43, 78

[56] References Cited

U.S. PATENT DOCUMENTS

| | | | |
|---|---|---|---|
| 4,841,815 | 6/1989 | Takahashi | 364/424.1 |
| 4,862,854 | 9/1989 | Oda et al. | 123/399 |
| 5,036,730 | 8/1991 | Sakai et al. | 364/424.1 |
| 5,099,428 | 3/1992 | Takahashi | 364/424.1 |
| 5,148,721 | 9/1992 | Anan et al. | 364/426.04 |
| 5,162,997 | 11/1992 | Takahashi | 364/424.05 |
| 5,172,785 | 12/1992 | Takahashi | 180/141 |
| 5,182,710 | 1/1993 | Tomisawa | 364/424.1 |
| 5,189,621 | 2/1993 | Onari et al. | 364/431.04 |
| 5,303,153 | 4/1994 | Sakai et al. | 364/424.1 |

FOREIGN PATENT DOCUMENTS

| | | |
|---|---|---|
| 0304089 | 2/1989 | European Pat. Off. . |
| 0347261 | 12/1989 | European Pat. Off. . |
| 0347263 | 12/1989 | European Pat. Off. . |
| 0377953 | 7/1990 | European Pat. Off. . |
| 0391387 | 10/1990 | European Pat. Off. . |
| 0454504 | 10/1991 | European Pat. Off. . |
| 3811541 | 10/1988 | Germany . |
| 4107879 | 10/1991 | Germany . |

*Primary Examiner*—Kevin J. Teska
*Assistant Examiner*—Tan Nguyen
*Attorney, Agent, or Firm*—Davis, Bujold & Streck, PA

[57] ABSTRACT

The invention concerns a control system (10) for changing automatic gears (3) that operates according to fuzzy logic methods. All the fuzzy-production rules are divided into at least three sections: a set of basic rules to determine the gear-changing point in a consumption-oriented driving style, a set of adaptation rules to modify the set of basic rules depending on a current driving style and an identification set of rules for classifying the driver according to his/her driving style. By way of a supplementary set of adaptation rules the set of basic rules can be additionally modified according to a current driving condition. Individual function blocks (11 to 15) operate preferably according to the same inference mechanism. Gamma operators are used in order to approximate as closely as possible human behavior. A process is proposed for generating membership functions to determine a running condition by fuzzy-production rules. In a preferred embodiment the adaptive gear-changing behavior is activated by forming offsets. Priorities are allotted to the rules especially for reasons of safety and reliability.

20 Claims, 5 Drawing Sheets

CONTROL SYSTEM FOR CHANGING AUTOMATIC GEARS

The invention concerns a control system for changing automatic gears. It in particular concerns a control that makes use of fuzzy logic methods for determining the gear-changing point. There exist means (sensors, switches, etc.) for detecting input variables derived from a driver-vehicle system. Membership functions, that is, fuzzy sets, are produced for the input variables; means also exist for this. Means such as hydraulically actuatable gear clutches and valves have further been provided for changing gear ratios. The means for detecting the input variables and the means for producing membership functions and the means for changing the gear ratio work together in a specific manner. According to fuzzy-production rules, there are produced output variables with which a gear ratio is determined.

Automatic gears basically serve for adapting the torque delivered by a drive engine of a vehicle to the traction force thereof. Such automatic gears have an electronic hydraulic control. The electronic control possesses a primary importance for the whole driving behavior, since the gearshift operations are recognized and carried out with the aid of load-speed performance graphs.

Whether to change and to which gear depends on the load adjustment, that is, on the actual state of the throttle valve and of the output speed of the transmission. The individual gear steps are changed in accordance with gearshift characteristics formed from said two parameters. The gearshift characteristics of automatic gears consist of upshift and downshift straight lines for the individual gears, which in a gearshift diagram extend in a manner such that a hysteresis originates between the individual speed ranges. Despite said hysteresis, sharp decision thresholds finally determine whether and at what speed to change gears. The use of such sharp decision thresholds means, one hand, that only discrete, invariant conditions can lead to the triggering of a change-over operation and, on the other, that a distortion of the logical information contents of the decision is here systematically present. Said information can be explained with the aid of an example: when the throttle valve position is steady, a speed of 3000 revolutions/min. can, in the critical case, lead to a change of gear while at a speed of 2990 revolutions/min. no change of gear is started even though both system conditions are practically the same.

Other criteria can influence the design of a gear-change diagram by virtue of the position of the gear-change characteristics. In performance-oriented (sport) driving style, a relatively late upshift and an early downshift results. In a consumption-oriented (economic) driving style, the position of the characteristic lines is inclined toward a medium engine speed. The gear-change behavior of automatic gears can be changed by activating adaptive gear-change characteristics, that is, gear-change characteristics oriented toward the performance, the consumption, or special driving conditions.

Despite a multiplicity of possibilities already used for automated determination of the gear-change point, the purpose of approximating the automatic gear selection to the behavior of a human driver, especially of a certain type of driver, has been only imperfectly obtained.

A possibility of better representing a decision made by a human, such as is possible via threshold values or performance graphs, is the use of the fuzzy logic method. A fuzzy-inference system permits a decision in which a multiplicity of parameters are taken into account and is influenced by features of human decision making. A greater advantage of this method consists in allowing a direct processing of verbally formulated problem descriptions. Contrary to traditional control strategies, it is possible to use judgment criteria which cannot be expressed in mathematical description forms but plays a substantial part in the making of decisions.

An example of a control system for changing automatic gears making use of fuzzy logic methods can be seen in U.S. Pat. No. 4,841,815. The vehicle speed and change thereof, the engine load and change thereof and the tractional resistance are here processed as input variables so as to establish fuzzy conditions for each gear to be changed. This control system is based on a complex matrix consisting of fuzzy conditions linked to each other in parallel and in series. Compared to a gear control where the gear step can only be determined by the vehicle speed and the opening of the throttle valve, the fuzzy control thus known involves an improvement in the sense that the sharp decision thresholds mentioned at the beginning are not present.

However, the known control has disadvantages from two points of view. On one hand, there are not any fuzzy rules of the type "when . . . then . . . " used to represent the expertise of a human driver. On the other hand, functionally complicated fuzzy sets are used. Here the sets are not formed by straight lines but by functions deviating from straight lines which are mathematically costly to describe and costly to process. For the case here involved of a relatively small number of input variables the point of departure can be acceptable computing times. The proposed presentation of the fuzzy sets and processing thereof is not well suited to complex systems.

A control system for changing automatic gears according to the fuzzy logic method and using fuzzy-production rules can be deduced from EP-C-O 347 261 and EP-C-O 347 263. The proposed solutions deal with the treatment of special driving situations in order to optimize the driving behavior. What is especially concerned is the prevention of undesired oscillating changes.

These known solutions make use of a very large number of fuzzy-production rules. This results, in part, in very similar information and limitations to sharp threshold-value decisions. Another consequence of the very large number of fuzzy-production rules is an unoptimized control system which is only relatively expensive to implement and results in comparatively long computing times.

DE-A-41 07 879 also belongs to solutions concerned with contemplating special travel situations making use of fuzzy logic.

From EP-C-O 454 504 is also to be deduced a control system for changing automatic gears that takes into consideration the normal driving operation and also special travel situations making use of fuzzy logic. This system is also based on a comparatively large number of fuzzy rules which are to be regarded equal to each other. An exception here is constituted by priority rules (metarules) which prevent overspeed of the engine. An unoptimized control system with a large number of rules is also involved in this solution.

Common to all the above explained control systems for changing automatic gears is that the methods of the fuzzy logic are either used in an intrinsically insufficient manner or are used only when considering special driving situations, or, when together with the normal driving operation special driving situations also have to be taken into consideration. Thus, these systems become involved, unoptimized control systems with long computing times and based on a large number of rules. None of the systems known is in position to quickly and effectively adapt the gear-changing behavior to practical requirements.

This invention is based on the problem of providing a control system for changing automatic gears which in the design of the gear-changing strategy takes into consideration, by making use of fuzzy logic methods, judgment criteria like: performance, consumption and expense, and which by altering as needed the gear-changing behavior by activation of adaptive gear-changing strategies, also efficiently reacts to special features like driving style and driving condition.

The problem stated is solved according to the invention by a control system for changing automatic gears which has its point of gravity lying on an adaptive common structure. For this purpose all the fuzzy-production rules are divided into sections. A set of basic rules of fuzzy-production rules serves for designing a gear-change diagram which reproduces a normal consumption-oriented travel style. Said set of basic rules consist of a few rules representing the expertise of a human driver. The gear changing strategy on which said gear-change diagram is based is adapted by a set of adaptation fuzzy-production rules in accordance with an actual driving style. The gear-changing behavior changes from a consumption-oriented driving style to a performance-oriented driving style. The actual set of basic rules is here always kept in the same manner, that is, no rules are added and no rules are canceled or modified. The information for varying the driving style is impressed on the system by the design of the set of fuzzy adaptation rules by making use of rule priorities and fuzzy operators and optionally of fuzzy modifiers. The adaptation of the gear-changing characteristics depends on output variables delivered by a set of identification fuzzy-production rules. According to said rules a driver is classified by his/her driving style which goes from a consumption-oriented travel style to a performance-oriented travel style.

Another essential advantage of the proposed solution consists in that the sections of the fuzzy-production rules used are each formed by a few individual rules. By virtue of the hierarchic arrangement of the sections proper, an optimized control system results by means of which adaptive gear-changing strategies can be effectively activated. This is to be attributed to the concentration of individual rules, to an optimal control structure and consequent quick computing times.

In a preferred embodiment of the control system according to the invention, adaptive gear-change strategies are activated where an existing travel condition (city, highway, ascent, expressway) is taken into consideration with the aid of a supplementary set of adaptation fuzzy-production rules.

It is convenient to provide a filter for identifying the driver. The measured variables (for ex.: throttle valve position, change of the throttle valve position per unit of time, output speed, acceleration, deceleration, actual gear, traction excess, transverse acceleration, steering angle, steering angle velocity, brake switch in/out) represent the input variables which are converted to output variables by a filter. Said output variables are averaged features which characterize the driving style of the driver concerned.

The control system can be advantageously improved as to the reliability thereof by also taking into consideration the driving condition existing at that time. Similarly to the identification of the driver, for recognizing the driving condition certain input variables are reduced by a filter to output variables in the form of averaged characteristics. The latter permits a detection of the driving condition (city, expressway, ascent, highway). The filters for identifying the driver and detecting the driving condition can be separate parts or a common part.

In order to quickly obtain information capable of resulting in the driver's identification and also in recognizing the driving condition, it is advantageous that the output variables be produced by filtering according to fuzzy-production rules. The fuzzy filtering proposed operates in such a manner that clear characteristics quickly lead to a corresponding evaluation while less clear characteristics influence more slowly an evaluation.

In order to change the above mentioned guidelines, it is advantageous that, according to fuzzy-production rules, the filter increments evaluation coordinates with input variables of different significance. Said increments are added to evaluation numbers that form the output variables. If a characteristic, for instance, is strongly impressed, then the evaluation increment is positively large. If it is weakly impressed, the evaluation increment is conveniently zero.

Since the fuzzy-production rules used for filtering at first show only a tendency and only by subsequent addition of said increments does a definitive evaluation number result, the filter is composed of a control processor portion and an integrator.

For the respective evaluation increment (positively large=+1, zero=0 and negatively large=−1), an asymmetric encoding is also possible instead of a symmetric encoding of the sequential conditions. By an asymmetric encoding of the sequential conditions, it is possible to weigh differently the gradients in the case of ascending or descending input variables in a convenient manner.

Also proposed within the scope of this invention is a process for producing membership functions (fuzzy sets) for determining a driving condition according to fuzzy-production rules. Said process is characterized by the following steps: for the driving condition to be recognized, measured traces of significant vehicle parameters are incorporated by driving tests or by mathematical simulation. From said measured traces discrete density function values are calculated which represent typical ranges. An envelope is formed via the density function values and, finally, said envelope is standardized to a membership function.

In the production of the fuzzy set it can be advantageous to approximate the membership function produced by the envelope. It is preferably modified to form a triangular or trapezoidal fuzzy set.

A parametric representation of the fuzzy set of the density functions is advantageous with the parameters: frequency and amplitude classes. Only a few parameters need be stored in the parametric representation. For this only a small storage location is required, on one hand, and any desired fine analysis can be obtained on the other.

A differentiation between city, highway and expressway is convenient for identifying the driving condition. Compared to expressway travel, it is clearly necessary to change gears more often in city traffic. In ascents (serpentines) extremely disturbing oscillating changes of gear must be suppressed; here the gear with sufficient traction must be maintained. When descending, the driver makes use of the braking action of the engine so that corresponding downshifts are applied here. In situations where no clear information is possible, the driving condition "highway" is selected from the system. This is especially the case for stop-and-go operation.

In principle, it is possible to move at least one membership function of the basic set of rules by displacement in a direction parallel to the ordinate, in order to come to an adapted gear-changing behavior. Instead of a parallel displacement, a dynamic, non-linear variation can also be carried out. A combined procedure is also basically possible.

A change of the membership functions of the input variables of the engine speed and/or of the throttle valve position in the manner described is sufficient for adaptation of the gear-changing point.

A method that is preferred because of its special simplicity is modulation of the engine speed. The engine speed recommends itself, since it constitutes a primary strategic parameter of the system. As already mentioned, the set of basic fuzzy-production rules defines a consumption-oriented driving style. This especially applies to the fuzzy set of the engine speed. For a more performance-oriented driving style, the fuzzy sets of the set of basic rules must be "pushed" to higher speeds. This is possible in an especially simple and elegant manner when the input variable "engine speed" of the set of basic rules is modulated by addition of a non-linear offset. The offset can be implemented as a fuzzy-array. In the instant case the defuzing takes place by detection of the surface point of gravity so that the offset of the engine speed can make up any value between zero and 1,800 revolutions/min.

For reasons of safety it is advantageous and necessary to allot different priorities to the fuzzy-production rules. This can be easily done by an adjustable numeric value. A confidence measure can be coordinated with the rules via the priorities. Accordingly, reliable information receives more weight then vague knowledge.

To exhaust the possibilities offered by the fuzzy logic, gamma operators are preferably used in the aggregation of the fuzzy set of the basic, adaptation and identification sets of rules. The human decision can hereby be quite correctly modeled.

When needed, the fuzzy sets of the fractioned sets of rules can be altered by modifiers. In the standardization operation, a standardized fuzzy set is obtained. A stronger concentration of the fuzzy set (become more precise) results from the concentration operator. The fuzzy set is weakened by the dilation operator.

The combined allotment of priorities and the use of gamma operators is of particular advantage. The human decision is hereby especially well simulated while taking into consideration the aspects of safety and reliability.

According to another advantageous characteristic, all the fuzzy-production rules are hierarchically arranged in sets of rules. Said sets of rules are processed in the form of blocks. The processing thereof depends on the presence or absence of an entry condition. With the arrangement in sets of rules, an optimized control system is obtained with a selection of only really needed rules. Unlike a control system formed by a multiplicity of independent rules, which greatly increases the computation time, the distribution in individual sets of rules results in a selection in the processing of needed rules. The computation time is therefore accordingly abbreviated. The entry conditions can advantageously correspond to specific gear-changing rules or specific conditions.

The invention further includes a fuzzy controller with inputs from input variables to form membership values and inferences, and also means for defuzing output variables with which a gear ratio of a gear to be automatically changed is determined.

Said fuzzy controller distinguishes itself by a rule processor for determining gear-changing points according to a set of basic rules, a rule processor for adapting the gear-changing points according to a set of adaptation rules, a rule processor for identifying a driver according to a set of identification rules and also by a rule processor for recognizing a driving condition according to a supplementary set of adaptation rules. Said rule processors are all situated on a processor chart, which simplifies the production.

It finally can be to the driver's advantage if the mode of operation of the control system is visually shown to him. For this, a modulus for visual display of the gear steps detected according to the set of basic rules, of the adapted actual gear steps and/or of the driving style of the driver and/or of the driving condition is proposed. Advantageously what is here concerned is an LCD display.

Other features essential to the invention and the advantages resulting therefrom are to be understood from the description that follows of an embodiment with reference to drawings.

Figure 1:
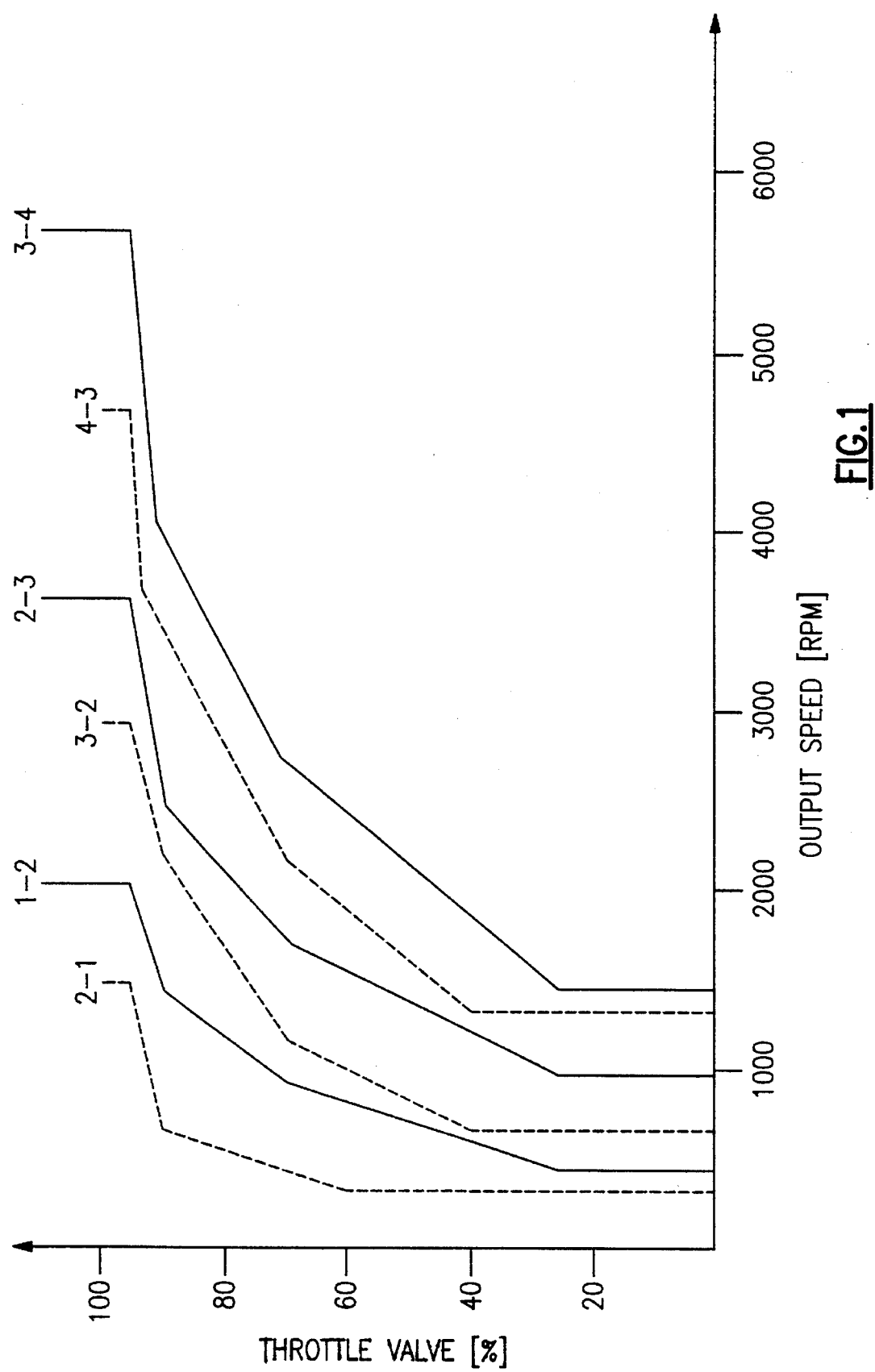
FIG. 1 shows a conventional (prior art) gear-changing diagram of an automatic gear.

In FIG. 1 the gear-changing diagram (transmission performance graph) of an automatic (step) gear is diagrammatically reproduced. The illustration corresponds to the prior art and serves only to illustrate a few situations. On the ordinate is plotted the output speed of the transmission—according to a driving speed. On the abscissa is plotted in percent the throttle valve position (from completely closed to completely open). The straight lines shown by continuous lines are upshift straight lines which mark the ranges of the individual transmission speeds in accordance with the power to be transmitted. These are the upshift straight line 1-2 from first to second gear, the upshift straight line 2-3 from second to third gear and the upshift straight line 3-4 from third to fourth gear. Similarly, the straight lines drawn in broken lines mean the downshift straight lines from the respective high gears four, three and two to the respective lower gears three, two and one. There is a hysteresis range between the downshift straight lines 2-1, 3-2 and 4-3 and the upshift straight lines 1-2, 2-3, and 3-4, since the straight lines do not extend coincidentally. This prevents the oscillation of the automatic gears so that after the downshift an upshift will not immediately be made as result of a rising driving velocity.

From the gear-changing diagram on FIG. 1, it is to be assumed that an economic driving style is being reproduced.

From the gear-changing diagram explained, two essential conclusions can be drawn. To change gears of automatic gears, it is decided, with the aid of gear-changing diagrams or load/speed performance graphs (transmission performance graphs), whether a gear-changing operation is required. Whether and into what gear to change, thus exclusively depends on the current throttle valve position (gas pedal) and on the output speed. The upshift and downshift straight lines are precise decision thresholds. The use of such precise decision thresholds means, on one hand, that only discrete, invariant conditions can lead to the start of a gear-changing operation and, on the other, that a distortion of the logical content of the decision is here systematically present. For instance, a speed of 3,000 revolutions/min. (assuming the position of the throttle valve remains the same) leads to a change of gear while at a speed of 2,990 revolutions/min. no change can be started even though the conditions of the system are almost identical.

The gear-changing characteristics shown on the gear-changing diagram of FIG. 1 can be altered by activating adaptive gear-changing characteristics. In a performance-oriented driving style, the upshift and downshift straight lines are pushed in a direction toward higher engine speeds in comparison with a consumption-oriented driving style. Nothing changes here with regard to the fact of precise decision thresholds.

The invention deals in general with the problem of approximating, as close as possible, the determination of the gear-changing point to the gear selection of the human driver. To take into consideration here a multiplicity of parameters increases the safety of the logical decision. To avoid the mentioned disadvantages of a performance graph control and more realistically to model the human making of a decision, the invention uses fuzzy logic methods for determining the gear-changing point.

The construction and mode of operation of a control system, according to the invention, are explained as follows.

The control system according to the invention is essentially based on the use of verbal problem descriptions for determining a gear-changing point. A gear-changing point is first determined by a set of basic fuzzy-production rules which defines a consumption-oriented driving style. Said set of basic rules represents the expertise of a human driver.

Depending on a current mode of driving, the set of basic rules is modified by a set of adaptation rules. The set of adaption rules works with the fuzzy-production rules. The modification takes place continuously within the limits between a consumption-oriented and a performance-oriented driving style.

A set of identification fuzzy-production rules is used for recognizing the driving style of a certain driver which goes from a consumption-oriented driving style to a performance-oriented driving style.

It can, in general, be said that the set of basic rules itself always remain in the same manner. No rules are added and no rules are canceled nor is the information thereof modified.

The control system operates with the method of fuzzy logic, the foundation of which is formed by fuzzy sets (flat amounts). Said fuzzy sets represent the subjective conditions contained in the rule premises such as: high engine speed, medium vehicle velocity, small gas pedal position (throttle valve position), etc. Membership functions are concerned here by the aid of which can be found information relative to actual system parameters. Herefrom can be deduced a criterion for applying the individual rule premises.

Figure 2:
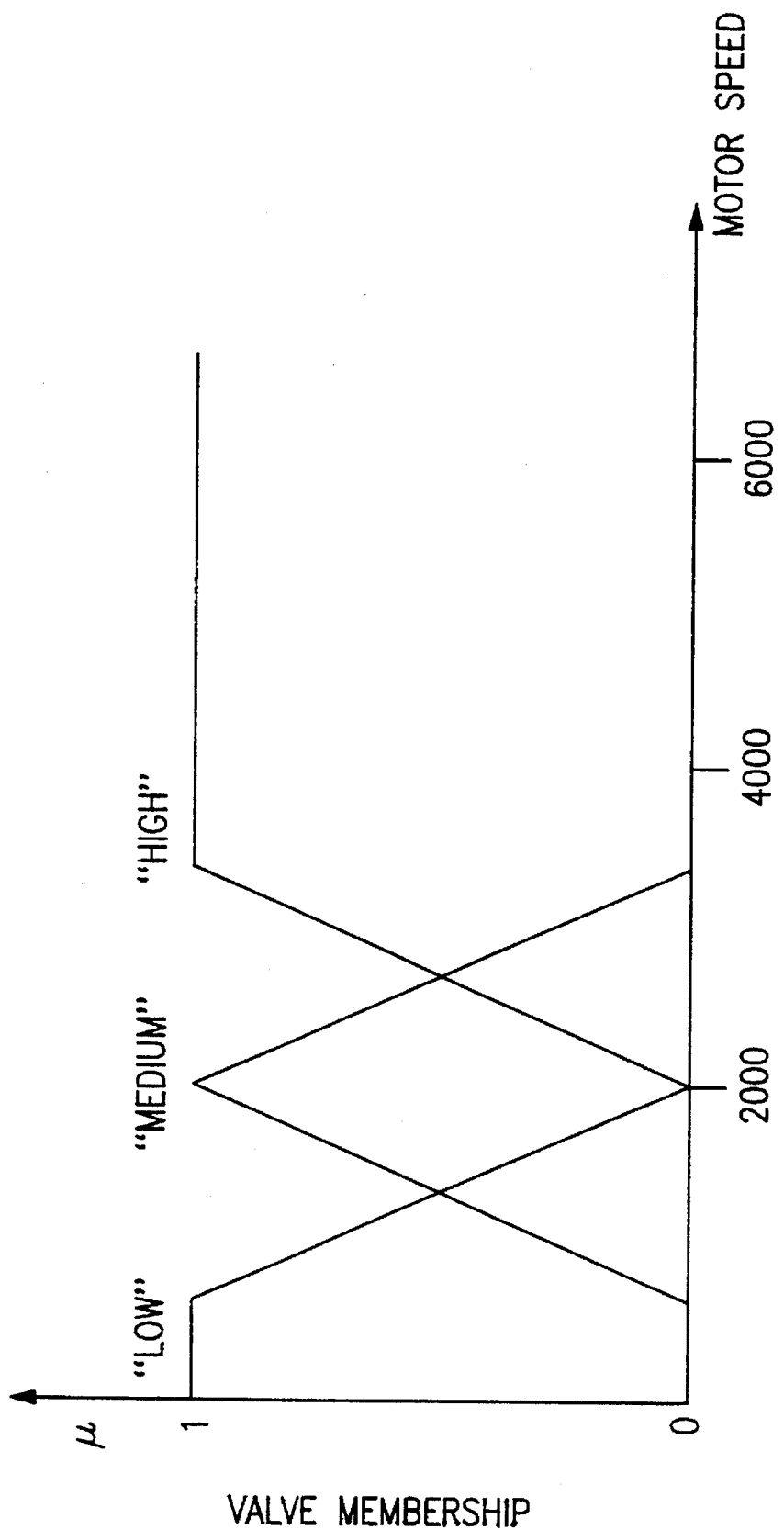
FIG. 2 shows membership functions on the example of the engine speed.

In FIG. 2 are reproduced individual fuzzy (sub)sets on the example of the engine speed. The engine speed is plotted on the ordinate in revolutions/min. On the abscissa are plotted membership values from zero to a maximum of one. The "low" flat amount engine speed is plotted by the trapezoidal fuzzy set shown to the left. The "medium" flat amount engine speed is defined by the central triangular fuzzy set. The "high" flat amount engine speed, in turn, is defined by the likewise trapezoidal fuzzy set to the right.

Figure 3:
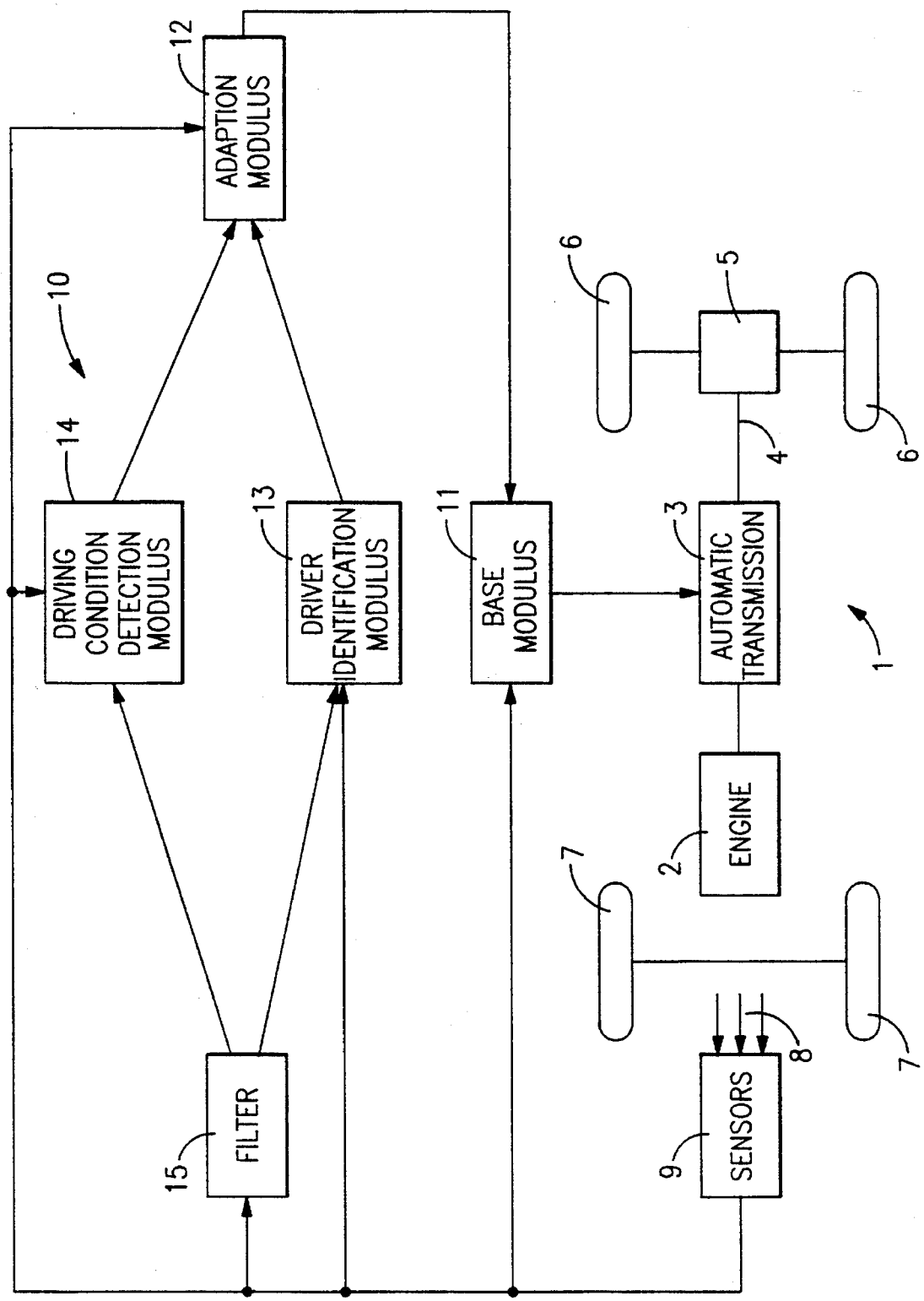
FIG. 3 shows a diagrammatic plan of the control system of the invention.

In FIG. 3, a vehicle 1 is diagrammatically drawn showing the main components thereof engine 2 and automatic gears 3, an input shaft line 4, a differential gear 5, the driven (rear) wheels 6 and the steerable front wheels 7.

A series of vehicle parameters is formed by input variables 8 which are continuously detected by suitable means 9 (sensors, etc.). Said input variables can be the following vehicle parameters: the throttle-valve position, the gradient of the change of position of the throttle valve, the actual velocity (wheel speeds), the acceleration, the deceleration, the positional arrangement of a gear selector switch, the calculated excess traction according to a possible upshift magnitude of the transverse acceleration, the magnitude of the steering angle, the velocity of the steering angle, the brake switch in/out, the blinker, etc.

The control system for changing the automatic gears 3 is composed of several function blocks:

a function block 11 which can be designated as a base modulus;

a function block 12 which is used as an adaptation modulus;

a function block 13 as a modulus for driver identification;

a function block 14 as a modulus for detecting the driving condition; and a function block 15 which has to perform different filtering jobs.

The linkage marked by arrows are provided between the individual function blocks 11 to 15.

Construction and mode of operation of the function block 11

As the base modulus, the function block 11 has the job of determining by fuzzy logic methods a gear-changing point which reproduces an economic driving style. The expertise of a human driver is defined by the following rules:

Rule 1: (priority: 1.0, gamma 0.0) When engine speed is high and gear step is low, then upshift one gear.

Rule 2: (priority: 0.9, gamma: 0.0) When engine speed is low and gear step is high, then downshift one gear.

Rule 3: (priority: 1.0, gamma 0.0) When engine speed is medium, then maintain the gear.

Rule 4: (priority: 3.0, gamma: 0.1) When engine speed is not high and throttle valve is large and acceleration is positive and gear step is low, then maintain the gear.

Rule 5: (priority: 2.0, gamma: 0.1) When engine speed is not low and throttle valve is small and acceleration is positive and vehicle velocity is low, then upshift one gear.

Rule 6: (priority: 1.0, gamma: 0.0) When throttle valve is very large and gear step is high and vehicle velocity is medium and acceleration is insufficient, then downshift one gear.

For determining the gear-changing point, the above stated rules 1 to 6 form a set of basic rules which define a consumption-oriented driving style. It can be seen that the rules are divided in priority classes whereby special requirements (such as safety aspects) are taken into account.

Gamma operators are used in order to better reproduce human decision behavior. The gamma operator (according to Zimmermann and Zysno) is normally used with the equation:

$$\mu_{rule} = (\mu_A \mu_B \ldots)^{1-gamma} (1-(1-\mu_A)(1-\mu_B)\ldots)^{gamma}$$

For gamma=0 there is a normal AND conjunction. The result is formed by the multiplication of the individual probabilities. If gamma=1 is present an OR conjunction, which is shown by the complementary formation of the AND conjunction. For the range 0< gamma <1, there is a compromise between AND and OR for the linkage, which depending on the interpretation of gamma can tend more or less in one direction.

When the fuzzy-production rules 1 to 6 of the set of basic rules are evaluated in the manner described, the step of finding an aggregated result still remains.

For this purpose the conclusion of each rule (then part) is weighted with the evaluation number (correct probability) of its premises and the resulting values are added up. Technically regarded, the result is a "weighted surface center of gravity" of the individual basic rules:

$$\text{surface center of gravity} = \frac{\Sigma(\mu_i * \text{sequence}_i)}{\Sigma \mu_i}$$

In determining the gear-change point according to the set of basic rules, the encoding method is preferred in the control conclusions. The range (sequence$_i$) of the sequence parameter "gear" appears as follows:

| upshift 1 gear: | = +1 |
|---|---|
| maintain the gear: | = 0 |
| downshift 1 gear: | = −1 |

Since the result (weighted surface center of gravity) is a pure numerical value, but the (step) gear to be controlled here admits only discrete gear-changing conditions, a corresponding conversion must be added. Said conversion can now take place directly by case distinction:

| result < $x_1$: | downshift (by one gear) |
|---|---|
| $x_1$ <= result <= $x_2$: | maintain the gear and |
| result > $x_2$: | upshift (by one gear) |

Construction and mode of operation of the function block 12

The framing of basis criteria of the known gear-changing strategies for economic and performance-oriented gear-changing characteristics are points of departure for the considerations of a gear-changing point adaptation. A comparison of said standard characteristics leads to two generally valid statements:

1. The more performance-oriented (sporty) the driving style and higher the gear step and heavier the power requirement (position of the throttle valve) in a medium load range, the later will be an upshift and the earlier a downshift;
2. In the kick-down range, the gear-changing point is independent of the driving style.

The displacement of the gear-changing points to be effected according to said guidelines can be carried out in two ways:

1. Corresponding fuzzy sets of the set of basic rules (function block 11, the basic modulus) are changed so as to obtain the desired characteristic; or
2. Instead of a relatively costly displacement of separate fuzzy sets, the same effect can be achieved by a corresponding modulation of the accessory measured variables.

Figure 4:
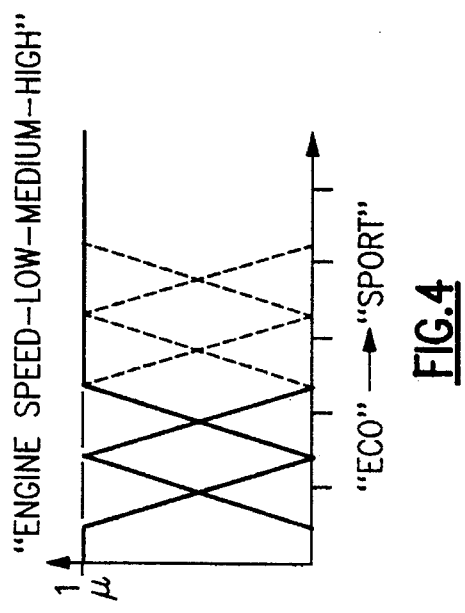
FIG. 4 shows other membership functions on the example of the engine speed.

The first way of the proposed solutions that follow are explained below having reference to FIGS. 4 to 7:

Similarly to the reproduction on FIG. 2, in FIG. 4 is shown the fuzzy set for the engine speed consisting of the fuzzy (sub)sets: engine speed "low", "medium" and "high." The fuzzy (sub)sets are marked by continuous lines that correspond to a consumption-oriented (economic) driving style.

To obtain an adaptive gear-changing characteristic, the fuzzy set of the engine speed can be pushed in a direction parallel to the ordinate to higher speeds. Thus, a shift from a consumption-oriented to a performance-oriented (sporty) driving style takes place. The displaced fuzzy sets are marked by dashed lines. The result of said displacement is upshift straight lines that are moved to the right, which are marked in FIG. 5 with dashed lines.

The membership functions of the set of basic rules are varied independently of output variables of a set of adaptation rules, which will be discussed herebelow in more detail.

Figure 5:
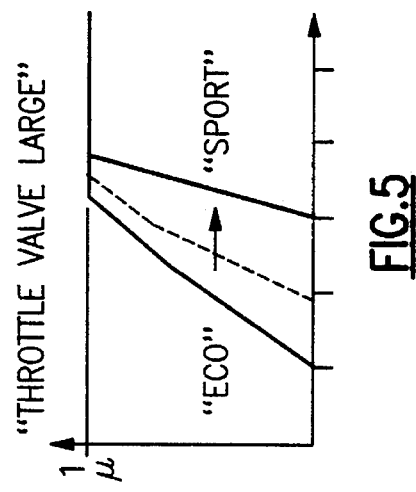
FIG. 5 shows membership functions on the example of the throttle valve position.

In FIG. 5, the variation of the upshift characteristic of the fuzzy system ("economic" . . . "sport") in conformity with the fuzzy (sub)sets "throttle valve position" are qualitatively shown.

Let it be pointed out at this juncture that FIGS. 4 and 5 show only the parameters "engine speed" and "throttle valve position." The final result of an adaptation is obviously the result of a linkage of parameters which are defined by the set of basic rules. This is quite a decisive advantage resulting from the use of the fuzzy logic methods.

It is further possible to accomplish the variation from consumption-oriented to performance-oriented gear-changing characteristic only by a dynamic, non-linear variation of the fuzzy set of the engine speed.

Within the scope of the general idea followed here, the main purpose of which is among others an optimized control system and brief computation times, two solutions are preferably used. The engine speed is chosen as the parameter to be modulated. The engine speed constitutes a primary strategic parameter. As explained, the set of basic rules describes a consumption-oriented driving style. To obtain a performance-oriented driving style, an offset is non-linearly added to the actually measured value of the engine speed. Let it be observed, for keeping in mind, that the actual value of the engine speed constitutes an input variable of the function block 11 (base modulus, gear-changing point determination).

The above mentioned offset is formed in the function block 12. Thus, by way of the modulated engine speed value, fictional engine speeds are indicated to the function block 11 instead of the actual engine speeds. The "manipulated" input variables of the engine speed result in a change of the shifting characteristics in the manner desired, that is, in a direction toward a performance-oriented shifting characteristic.

The function block 12 works according to the following fuzzy-production rules:

Rule 1: (priority: 3.0, gamma: 0.0) When driving style is sporty and throttle valve is medium, then offset is large.

Rule 2: (priority: 3.0, gamma: 1.0) When driving style is economic or throttle valve is very large or throttle valve is small, then offset is zero.

Rule 3: (priority: 1.0, gamma: 0.0) When driving style is speedy and throttle valve is medium, then offset is medium.

Rule 4: (priority: 1.0, gamma: 0.0) When driving style is sporty and throttle valve is large, then offset is zero.

Rule 5: (priority: 1.0, gamma: 0.0) When driving style is sporty and throttle valve is small, then offset is small.

Rule 6: (priority: 1.0, gamma: 0.0) When driving style is sporty and speed is high and throttle valve is not very large, then offset is medium.

Rule 7: (priority: 1.0, gamma: 0.0) When driving style is sporty and speed is low and throttle valve is not very large, then offset is small.

The encoded sequence conditions for the offset of the engine speed can be established as follows (the speed values given are reference values from which it can be deviated more or less according to the technical conditions):

| offset: | Change of the engine speed (rpm) |
|---|---|
| zero | 0 |
| small | 600 |
| medium, and | 1,200 |
| large | 1,800 |

Within the scope of the solution described, the offset for the engine speed is preferably determined by the method for determining the weighted surface point of gravity so that the offset can continuously vary between zero and 1,800 revolutions/min.

The fuzzy-production rules processed in the function block 12 represent a set of adaptation rules which modifies the set of basic rules processed in the function block 11, this is done depending on the actual driving style which goes from consumption-oriented to performance-oriented driving style. The output variables of the function block 12 are, at the same time, input variables of the function block 11 (as mentioned at the beginning, the input variables 8 derived from the vehicle parameters belong also to the input variables).

Construction and mode of operation of the function block 13

From the statement of the adaptation rules it can be understood, without difficulty, that the adaptation of the gear-changing point depends on the driving style of a driver. In order to induce the function block 12 to an offset (or another variation of the basic set of rules), an identification result (input variable of the function block 12) which classifies a driver uninterruptedly from "economic" to "sporty/performance-oriented", according to his/her driving style, must be communicated to it. The function block 13 delivers said identification result. Said function block 13 operates as driver-identification modulus.

The following measured variables (input variable, vehicle parameters) are used as characteristics for the driving style (this preferably occurs here after passing through a filter).

Throttle valve position, gradient of a change in the throttle valve position, vehicle velocity (output speed), acceleration, deceleration, position of the gear position switch, traction excess after a possible upshift, transverse acceleration, steering angle according to size and velocity, brake switch in/out.

The function block 13 processes identification rules for identifying a driver according to his/her driving style which goes from a consumption-oriented to a performance-oriented driving style.

The set of identification fuzzy-production rules can be stated as follows:

Rule 1: When acceleration is small and throttle valve is small, then the driving style is economic.

Rule 2: When acceleration is medium and throttle valve is small, then the driving style is economic.

Rule 3: When acceleration is small and throttle valve is medium, then the driving style is speedy.

Rule 4: When acceleration is medium and throttle valve is medium, then the driving style is speedy.

Rule 5: When acceleration is medium and throttle valve is large, then the driving style is sporty.

Rule 6: When acceleration is great and throttle valve is medium, then the driving style is speedy.

Rule 7: When acceleration is great and throttle valve is large, then the driving style is sporty.

It is possible to condense the first two rules in one common rule:

Rule 1/2: When acceleration is not great and throttle valve is small, then the driving style is economic.

Rules 5 and 7 can also be similarly condensed:

Rules 5/7: When acceleration is not small and throttle valve is large, then the driving style is sporty.

Rules 3, 4 and 6 can also be condensed in principle. But the statement as separate rules is more advantageous for inference formation.

To illustrate the working principle of function block 13, by way of example, a partial standard amount used for classifying the parameters "throttle valve position" and "vehicle velocity" (output speed) must be imagined. The working principle must be explained with reference to the matrix:

| | throttle valve | | | |
|---|---|---|---|---|
| acceleration | small | medium | great | driving style |
| small | ec. | ec.->Z | Z | ec. = economic |
| medium | ec.->Z | Z | Z->S | Z = speedy |
| great | Z | Z->S | S | S = sporty |

From the matrix it results that a consumption-oriented driver stands out by small values of the throttle valve position and acceleration. He is recognized by this. A great activity in the change of the throttle valve position and high acceleration values represent the performance-oriented driver. A smooth transition between said limits is obtained by additional rules for a "speedy" driving style.

Arrows (for ex. ec.->Z) appear in separate fields of the matrix. Said fields stand for ranges where a clear information cannot be found with regard to the driving style. These conditions can also correspond to ascending or descending travel. But in spite of this, a convenient decision is arrived at, since the inference method of the weighted surface point of gravity used here draws a decision from several rules.

Job and mode of operation of the function block 15

The job of the function block 15 is to filter the input variables used for identifying the driver. The input variables are converted to output variables in the form of averaged characteristics. Said reduced characteristics allow an identification of the driving style of a certain driver.

In a preferred construction step of the control system of the invention, the function block 15 assumes another function as a filter: Input variables for recognizing the driving condition are reduced to output variables in the form of averaged characteristics which permit a recognition of the driving condition. This function will be discussed in detail further below.

There are two possibilities of filtering, that is, reducing the input variables used for identifying the driving style of a driver to a "medium characteristic":

a) a conventional filtering; and b) a filtering by fuzzy logic methods.

Filtering by fuzzy-production rules which is based on two evaluation criteria, is preferred: precise characteristics must quickly lead to a classification of the driver; less precise characteristics classify the driver as cautious, that is, accordingly slower. In other words, this means that a performance-oriented driver is quickly recognized as such while a speedy driver reaches this evaluation only when he maintains his tendency to a performance-oriented driving style for a long period of time.

The function block 15 produces (first), on its output, an evaluation number by three generally applicable rules:

1. when the characteristic is strongly pronounced, then the evaluation increment is positively large;

2. when the characteristic is weakly pronounced, then the evaluation increment is negatively large; and
3. when the characteristic is moderately pronounced, then the evaluation increment is zero.

These rules generate, in the first place, a weighted incrementation and thus show a tendency. A definitive evaluation number results only by a subsequent addition of said increments.

The coding of the sequence conditions for the evaluation increment reads:

| positively large | = | +1 |
|---|---|---|
| zero | = | 0 |
| negatively large | = | −1 |

Also possible are asymmetric codings such as:

| positively large | = | +2 |
|---|---|---|
| zero | = | 0 |
| negatively large | = | −1 |

A different weighting of the characteristic gradients is thereby to be accomplished (quick ascent, slow descent). Construction and mode of operation of the function block 14

Together with taking into consideration the driving style of a driver, it is convenient to include in the evaluation a specific driving condition (city, expressway, ascent and descent). The function block 14 takes care of a corresponding adaptation of the gear-changing characteristic. Such an enlargement of the adaptive control system of the invention appears especially convenient because:

in city traffic, the driver expects a definitely greater gear-changing activity than on the expressway for instance;

when ascending, especially when driving along serpentines, it is disturbing to the driver when oscillating changes occur (here must be maintained the gear which offers a sufficient traction reserve);

when descending, so as to apply the braking action of the engine, adequate downshifts are used.

When the above stated knowledge is converted to a fuzzy control system, this leads to a supplementary set of adaptation fuzzy-production rules. With said supplementary set of adaptation rules, the set of basic rules (function block 11) can be modified by the function block 12 in accordance with a current driving condition.

Of course, it is necessary above all to recognize the different driving conditions. In the function block 14, this is done in a manner similar to the recognition of a specific driving style (function block 13).

The input variables of the function block 14 are the output variables of the function block 15 which, as it has been said, represent filtered characteristics, that is, characteristics that are averaged, over a long period of time. Here present are also vehicle velocity, throttle valve position and gradient of the adjustment of the throttle valve, acceleration, brake switch in/out, torque, blinker, steering angle, significant vehicle parameters (input variable of the function block 15).

Typical value ranges are coordinated with said parameters. The coordination takes place according to a specific driving condition. Therefore, said typical value ranges can be used as characteristics for recognizing a certain driving condition.

Here appears the favorable case that said typical value ranges can be used as fuzzy (sub) sets.

According to the invention a process is proposed for producing said fuzzy sets. Said process can be explained in more detail with reference to FIGS. 5 to 9.

There are first incorporated per driving test or, insofar as possible, also by mathematical simulation, typical charts (measured traces or the like) of vehicle parameters, again with the individual—known—driving conditions.

In the following step, the necessary typical value ranges are calculated from said charts. Mathematically regarded, said value ranges are density functions such as are known from statistics. The charted magnitudes of the vehicle parameters obtained from practical driving tests or from the simulation under specific driving conditions are coordinated, according to the absolute value thereof, with preliminarily defined amplitude classes (quantification steps). The number of the measured values in the individual amplitude classes K, computed from the total number of the incorporated measured values, form the function values of the density function.

Figure 6:
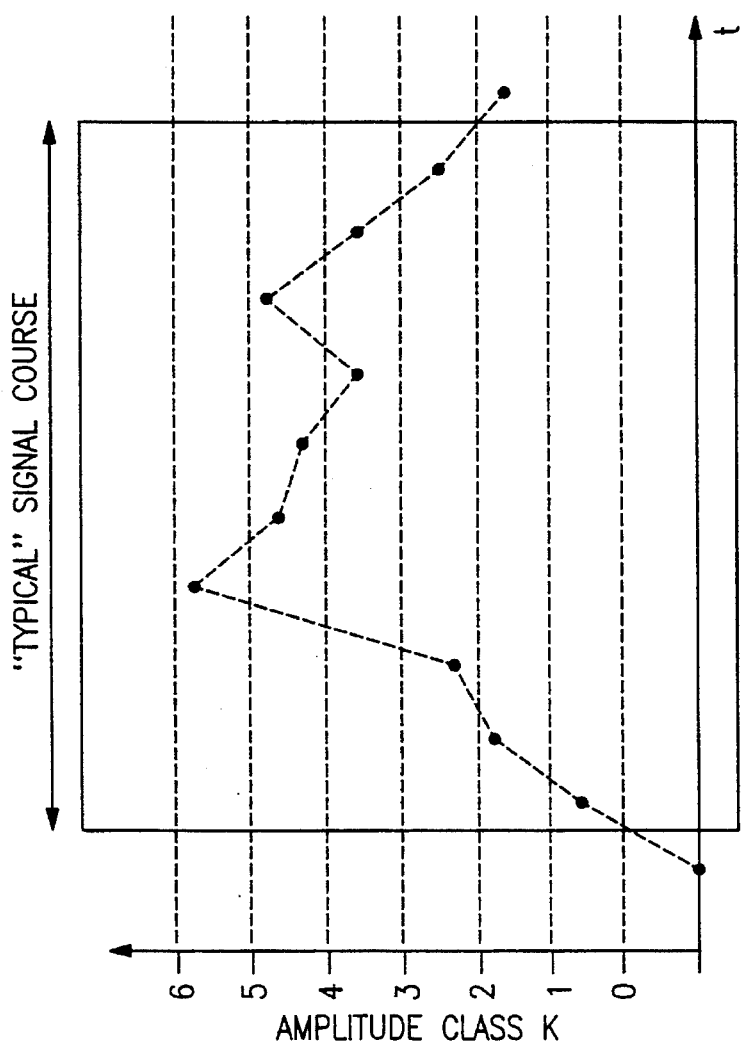
FIG. 6 shows typical courses of signals.

FIG. 6 shows a typical signal course of a significant vehicle parameter such as appears during the time t in the amplitude classes K zero to six.

Figure 7:
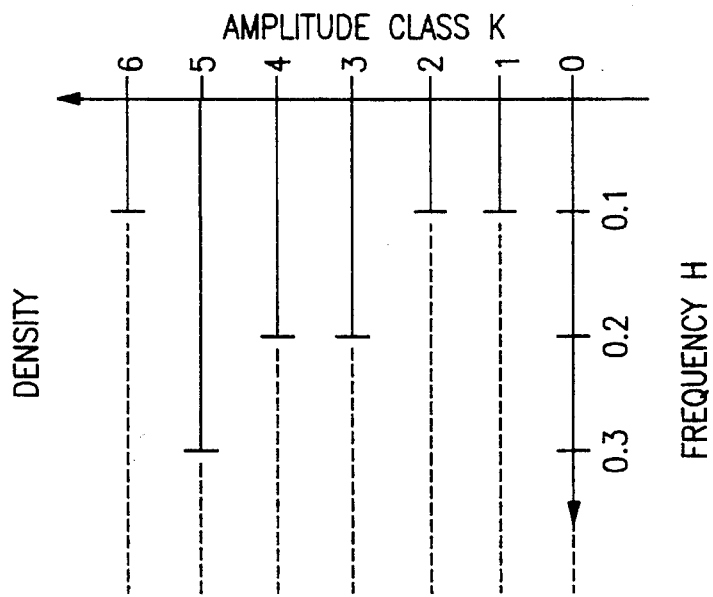
FIG. 7 shows a density function derived from typical signal courses.

FIG. 7 shows the accessory discrete density function belonging thereto. On the ordinate is registered the frequency H, that is, the probability with which an amplitude class K (zero to six) is registered on the chart of specific driving conditions.

Figure 8:
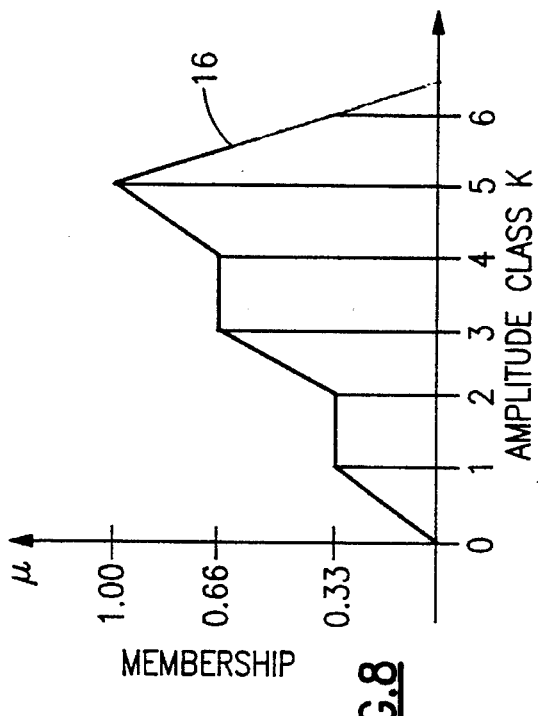
FIG. 8 shows a membership function for recognizing a driving condition.
Figure 9:
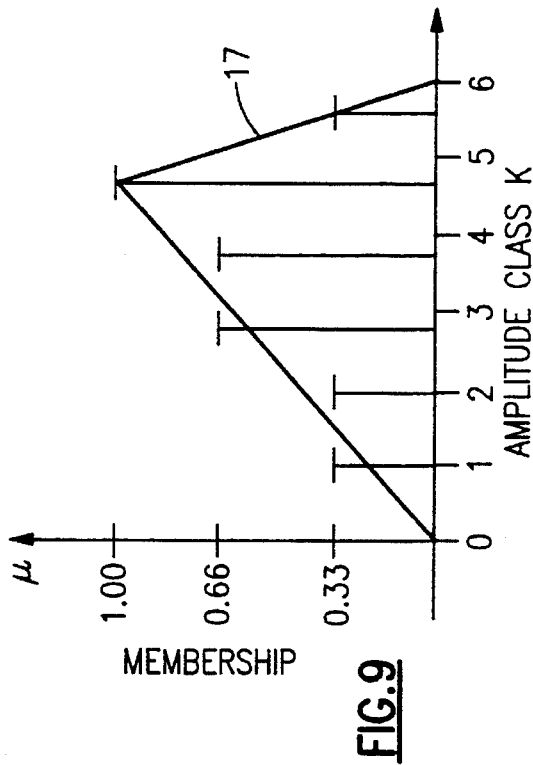
FIG. 9 shows the modified membership function according to FIG. 8.

In the next step, it is possible to go from the density function over to the fuzzy (sub) set by forming an envelope 16 (FIG. 8). The envelope is here formed by the discrete density function values according to FIG. 7. The envelope 16 is then standardized to the (membership) interval between the values 0 and the maximum of 1. The maximum value of the density is thus coordinated with the maximum value of 1 while the remaining density values receive a correspondingly lesser value of the membership.

The mode of operation of the function block 14 is explained by way of example with the aid of two vehicle parameters (vehicle velocity $V_{veh}$ and throttle valve activity $T_{act}$).

The control system of the example looks as follows:

1. When $V_{veh}$ is high and $T_{act}$ is not high, then the driving condition=expressway.
2. When $V_{veh}$ is small and $T_{act}$ is not low, then the driving condition=city.
3. When $V_{veh}$ is medium and $T_{act}$ is high, then driving condition=highway.
4. When $V_{veh}$ is medium and $T_{act}$ is medium, then driving condition=highway.
5. When $V_{veh}$ is medium and $T_{act}$ is low, then driving condition=highway.

Or as matrix:

| $T_{act}$ | $V_{veh}$ small | medium | high | driving condition: |
|---|---|---|---|---|
| low | H → 1 | H → E | E → 1 | C = city |
| medium | C → H | H | H → E | H = highway |
| high | C | C → H | H | E = expressway |

The places marked with arrows in the matrix again represent ranges at which no clear information (city, highway, expressway) is possible, for ex.: for $V_{veh}$ small and $T_{act}$ low to medium.

This condition is typical for the stop-and-go operation in a traffic jam. Although here the driver would like to be abreast in the "go-periods" he should make no early upshifts inasmuch as the next stop is already to be perceived.

A shifting program that works in city operation (that is, early change) is inadequate in congestion, since the constant change of gear is disturbing for the driver. An expressway program is likewise out of place, since in long "go periods" (column traffic) the delayed upshift unnecessarily increases consumption.

Therefore, a middle course between both extremes is convenient here. In the instant case, said middle course is the gear-changing characteristic for the highway that the fuzzy system selects (also without explicit rules in the specific conditions).

Possible modifications of the control system

Together with the use of fuzzy AND or OR operators and of the gamma operators, there can also be used fuzzy modifiers which approximate the shape of a fuzzy set. To these belong the concentration operator, the dilation operation, the standardization operation and the contrast intensification. Where possible, triangular or trapezoidal fuzzy sets are used. If desired, other forms are simplified into said fuzzy set classes, as reproduced in the example of FIG. 9. A straight line has been substituted here for the fuzzy set of FIG. 8 whose left edge extends by steps. The simplified fuzzy set belongs to the class of triangular fuzzy sets.

To obtain optimal calculation times, it is also of special advantage to arrange the whole fuzzy set-production rules in sets of rules. These are processed depending on the presence or absence of an entry condition.

A fuzzy controller adequate for use in the proposed control system distinguishes itself by control processors which process the individual fraction of the fuzzy-production rules. Said control processors can be arranged all on a processor chart.

The control system of the invention can also be used for directly establishing the nominal ratios of a continuous transmission. The result of the inference is converted here directly to continuous gear input values. The final conversion of the continuous result value into discrete gear steps is thus eliminated.

In infinitely variable transmissions, it is possible to calculate from the nominal ratio datum a corresponding nominal value for the engine speed (or gear input speed) and/or the vehicle velocity, as has already been proposed in the case of operating strategies for infinitely variable transmissions.

A visual display of the gear steps detected according to the set of basic rules, of the adapted actual gear step and/or of the driving style of the driver and/or of the driving condition can serve to inform the driver. This information is preferably produced by an LCD display.

REFERENCE NUMERALS 1 vehicle
2 engine
3 automatic gears
4 input shaft line
5 differential gear
6 driven wheels
7 steerable wheels
8 input variable
9 means to detect input variables
10 control system
11 function block
12 function block
13 function block
14 function block
15 function block
16 envelope
17 simplified fuzzy set

We claim:

1. A control system (10) for determining gear changing points for use in changing gears in an automatic transmission (3), said system including detection means (9) for detecting input variables derived from a driver-vehicle system, processing means (11–15) containing fuzzy-production rules for processing said input variables and producing output variables, and gear change means (3) for determining gear changing points for changing gear ratios according to said output variables, wherein the improvement comprises:

said processing means contains the following sets of fuzzy-production rules:
a) a set of basic rules for determining gear-changing points that define a consumption-oriented driving style, in accordance with current input variables detected by said detection means;
b) a set of identification rules for identifying a current driving style of a current driver, ranging from a consumption-oriented to a performance-oriented driving style, in accordance with current input variables detected by said detection means (9); and
c) a set of adaption rules for producing a set of modified rules, derived from the basic set of rules, for determining gear-changing points that define a driving style ranging from a consumption-oriented driving style to a performance-oriented driving style, in accordance with the identified current driving style.

2. A system according to claim 1, further comprising a filter (15) for reducing the detected input variables to average characteristics, to facilitate identification of the current driving style by the processing means.

3. A system according to claim 2, wherein said processing means further contains a set of supplemental identification rules for identifying a current driving condition, in accordance with current input variables detected by the detection means, and the filter (15) reduces the input variables to averaged characteristics to facilitate identification of the current driving condition by the processing means.

4. A system according to claim 2 wherein the filter (15) (i) reduces the input variables to averaged characteristics by evaluating a relative significance of each input variable according to fuzzy-production rules, and (ii) adds evaluation increments to each input variable in accordance with the determined significance to produce the averaged characteristics.

5. A system according to claim 4, wherein the filter (15) comprises a rule processor and an integrator.

6. A system according to claim 4, wherein, when the driver-vehicle system is one of ascending and descending an incline, the filter (15) asymmetrically weights input variables based upon a gradient of the incline differently when ascending than when descending and accordingly coordinates evaluation increments.

7. A system according to claim 3, wherein the supplemental identification rules differentiate between city, highway and expressway driving conditions and ranges where the identification of said driving conditions is uncertain.

8. A system according to claim 1, wherein the adaption rules produce the modified rules by shifting the basic rules by a linear displacement in a direction parallel to an ordinate.

9. A system according to claim 1, wherein the adaption rules produce the modified rules by shifting the basic rules by a non-linear displacement in a direction substantially parallel to an ordinate.

10. A system according to claims 1, wherein the adaption rules produce the modified rules by shifting the basic rules by a combination of a parallel and non-linear displacement substantially parallel to an ordinate.

11. A system according to claim 1, wherein said input variables detected by the detection means comprise at least one of engine speed and throttle valve position.

12. A system according to claim 1, wherein the adaption rules produce the modified rules by modulating at least one of the input variables by a non-linear addition of an offset.

13. A system according to claim 12, wherein said detection means detects at least engine speed as one of the input variables.

14. A system according to claims 13, wherein the processing means modulates the engine speed by implementing the offset as a discrete fuzzy set.

15. A system according to claim 14, wherein the discrete fuzzy set includes the following offsets:

| offset: | delta $n_{Mot}$ (rpm) |
| --- | --- |
| zero | 0 |
| small | 600 |
| medium | 1,200 |
| large | 1,800. |

16. A system according to claim 1, wherein said processing means allocates different priorities to the sets of fuzzy-production rules by adding an adjustable numerical value to said fuzzy-production rules.

17. A system according to claim 1, wherein the sets fuzzy-production rules are hierarchically arranged and processed in blocks, depending on the presence or absence of an entry condition.

18. A system according to claim 17, wherein the entry conditions comprise at least one of specific gear rules and specific conditions.

19. A system according to claim 1, comprising a display means for visual display of at least one of a determined gear step determined by the basic rules and the adaption rules, an actual current gear step, the current driving style, and the current driving condition.

20. A fuzzy-logic controller for determining gear ratios for use in changing gears in an automatic transmission, said controller having input means of receiving input variables derived from a driver-vehicle system, means to form inferences from said input variables according to fuzzy-production rules, and means for defuzzying said inferences into output variables for determining a gear ratio to be automatically changed, said controller comprising:

a) a rule processor for determining gear-changing points from said input variables according to a set of fuzzy-production basic rules;

b) a rule processor for identifying a driving style, of a current driver of said driver-vehicle system, from said input variables according to a set of fuzzy-production identification rules; and c) a rule processor for identifying a current driving condition from said input variables according to a set of fuzzy-production supplementary identification rules; and b) a rule processor for adapting the determined gear-changing points with a set of fuzzy-production adaptation rules according to said identified driving style and said identified driving condition.

* * * * *